(12) United States Patent
Van Surksum

(10) Patent No.: US 11,514,005 B2
(45) Date of Patent: Nov. 29, 2022

(54) NO-SQL REPOSITORY DATABASE AND ITS USE FOR AUTOMATION SERVICES REQUESTS PROCESSING

(71) Applicant: ATOS NEDERLAND B.V., Amstelveen (NL)

(72) Inventor: Jorrit Van Surksum, Zwolle (NL)

(73) Assignee: AGARIK SAS, Saint-Ouen (FR)

( * ) Notice: Subject to any disclaimer, the term of this patent is extended or adjusted under 35 U.S.C. 154(b) by 68 days.

(21) Appl. No.: 17/004,245

(22) Filed: Aug. 27, 2020

(65) Prior Publication Data
US 2021/0064587 A1 Mar. 4, 2021

(30) Foreign Application Priority Data
Aug. 30, 2019 (EP) ..................................... 19194691

(51) Int. Cl.
*G06F 16/21* (2019.01)
*G06F 16/23* (2019.01)
*G06F 16/22* (2019.01)
*G06F 16/16* (2019.01)

(52) U.S. Cl.
CPC .......... *G06F 16/211* (2019.01); *G06F 16/168* (2019.01); *G06F 16/2282* (2019.01); *G06F 16/235* (2019.01); *G06F 16/2329* (2019.01)

(58) Field of Classification Search
CPC ............................ G06F 16/211; G06F 16/2329
USPC ........................................................ 707/802
See application file for complete search history.

(56) References Cited

U.S. PATENT DOCUMENTS 10,466,342 B1 * 11/2019 Zhu ..................... G01S 7/4817
2013/0036419 A1    2/2013 Hazelet et al.

FOREIGN PATENT DOCUMENTS

WO    WO-2019130258 A1 *  7/2019 .......... G06F 11/0712

OTHER PUBLICATIONS

"RepoDB: Antidote to an Unsatisfying Assumption", Harvard Medical School, Mar. 26, 2017 (Year: 2017).*
"Database Decisions: SQL or NoSQL?", David Greenfield Director of Content, Automation World, Aug. 30, 2012 (Year: 2012).*
"RepoDb, a hybrid-ORM library for .NET", Michael Pendon, May 29, 2019 (Year: 2019).*
Search Report and Written Opinion issued in EP19194691.2, dated Nov. 5, 2019 (9 pages).

* cited by examiner

*Primary Examiner* — Muluemebet Gurmu
(74) *Attorney, Agent, or Firm* — Arc IP Law, PC; Joseph J. Mayo

(57) ABSTRACT

The invention concerns a No-SQL repository dataBase (RepoDB (12B)) for handling multiple legacy environments and registering a wide variety of configurations (software and hardware, and cloud) by storing technical data to support the end-to-end (E2E) automation and authorization of standard service requests (SSR) and wherein a table stored in RepoDB (12B) is configured to hold data in No-SQL format and for providing managed services (standard service requests) in very complex environments using at least one other database (Oracle or Mysql or MS SQL or DB2) and for the automation of database SSR.

3 Claims, 2 Drawing Sheets

NO-SQL REPOSITORY DATABASE AND ITS USE FOR AUTOMATION SERVICES REQUESTS PROCESSING

TECHNICAL FIELD OF THE INVENTION

The invention relates to the field of cloud services management and provision.

STATE OF THE PRIOR ART

Generally, cloud service providers offering hybrid and or multi-cloud services to major corporation has the challenge of providing orchestration of a vast number of legacy infrastructures of multiple customers and multi-cloud environments (Private/Public/Various brands GCP, AWS, Azure, VMware, OracleVM).

Services Orchestration platform (1) such as ServiceNow (SNOW) has a repository architecture that is limited by a relational repository database wherein all possible infrastructure relations have to be pre-defined. This is a huge requirement for a service provider when the number of legacy infrastructures of the customer is very important. Said relational repository does not allow storage of the various technical details of multiple customer environments.

This means that the technical details of the customer environment will have to be retrieved from the source systems at the customer site which leads to a lack of performance to cater, for example, for user-portal based automated scenario's with 'on-line' response requirements.

There are many data formats necessary to describe all different CI's (Configuration Items or Control Instances) in non-standardized Legacy environments that a multi and hybrid cloud solutions of a cloud service provider is managing. Further these technical data are too detailed to be stored in a cloud management database (CMDB (10)) and should be up to date.

The combination of these both requirements:
  an enormous variety of Infrastructure landscapes in legacy environments of bigger customers does not fit easy in an normal relational Database, and
  a very high requirement for response time and volumes when updates are done in a large legacy environment while Customer wants to have automatic provisioning and instantaneous repository updates were not satisfied up to now.

Therefore, there is a need for a system that solves this typical problem (for example integration of Legacy and Hybrid/Multi Cloud)

SUMMARY OF THE INVENTION

The present invention therefore has the object to obviate certain drawback of the prior art by proposing a computing infrastructure to be the connection between a services orchestration platform (such as ServiceNow) and the complex automation scenario's (for example, and without limitation, provisioning of application database using 'host' data or service processing for other database request such as modifying user, changing parameter) in the 'real' Service provider infrastructures and data management environments.

This goal is achieved by a computing device comprising a No-SQL repository database for handling multiple legacy environments and registering a wide variety of configurations (software and hardware, and cloud) by storing technical data to support the E2E automation and authorization of Standard Service Requests (SSR) and wherein a table stored in is configured to hold data in No-SQL format and for providing managed services (standard service requests) in very complex environments using at least one other database (Oracle or Mysql or MS SQL or DB2) and for the automation of SSR's database (Standard Service Requests).

According to another feature, the No-SQL format used is JSON (JavaScript Object Notation).

According to another feature, each line of the stored RepoDB table defines configuration items (CI) corresponding to a system identity (with the attribute sys_id) and including the creator name and date of creation, the updater name and date of update, the type of system (host, instance, software set, database) and a string of technical detail data in JSON format.

According to another feature, the No-SQL repository database is configured for storing technical data concerning CI (Configuration Items or Control Instances) in a dedicated database and sending this data to a GUI (graphical user interface) of a service orchestration platform used by an end-user or a service requestor to present this data to said end-user or service requestor in the graphical user interface of user computer.

According to another feature, the RepoDB is used in a system for automation of services standard requests (SSR) in a service provision computing infrastructure, said system comprising at least:
  computing means implementing a services orchestration platform for orchestration and configuration management of services in the computing infrastructure;
  an automation execution engine for technical configuration management and automation of the components of the computing infrastructure;
the system being characterized in that the RepoDB is interacting, through a communication network, with:
  the services orchestration platform for interaction with end-user (GUI controls) through controls including SSR;
  an automation execution engine for updates after changes and execution of SSR.

Another goal of the invention also concerns a method for providing automation of standard service requests.

This goal is achieved by a process wherein after an end-user of a services orchestration platform, communicating with a RepoDB as described above, selects a new order (standard service requests) from a catalogue of said services orchestration platform through a graphical user interface (GUI) of a dedicated user portal, said GUI prompts said end-user to select a CI so as to populate controls or attributes commands in the graphical user interface (GUI) by mean of a message, containing data to be loaded and, sent by the RepoDB to the Services orchestration platform.

According to another feature, the type of data of such attributes or controls depends on the Standard Service Requests (SSR).

According to another feature, when the order is not included in the catalogue of the services orchestration platform workflow, an execution of such order is required by a command sent, by the service orchestration platform, to the automation execution engine to let execute the command on the target database defined by the CI selected by the end-user.

According to another feature, the end-user completes with required details of the order form displayed on the user interactive interface by means of a set of information included in the loaded data contained in the message sent by the RepoDB (12B).

According to another feature, after the order is completed, a refresh routine included in the automation execution engine (for example Ansible refresh playbook) is called to refresh specific data for a specific CI in the RepoDB.

SHORT DESCRIPTION OF THE FIGURES

Other features, details and advantages of the invention will become apparent upon reading the description which follows with reference to the appended figures, which illustrate:

DISCUSSION OF THE INVENTION

The present invention concerns a No-SQL repository database and its use for automation of standard service requests.

Many combinations may be contemplated without departing from the scope of the invention; one skilled in the art will select either one depending on economical, ergonomical, dimensional constraints or others which he/she will have to observe.

Figure 1A:
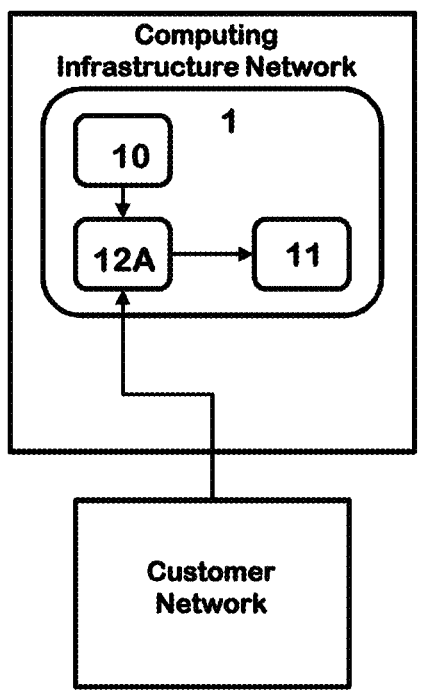
FIG. 1A, illustrates an infrastructure for orchestration of services requested by an end-user without a No-SQL repository database (RepoDB), according one embodiment.
Figure 1B:
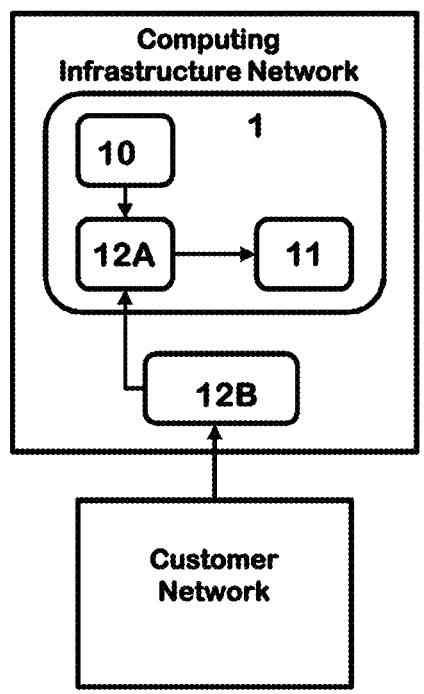
FIG. 1B, illustrates an infrastructure for orchestration of services requested by an end-user with a No-SQL repository database (RepoDB), according one embodiment.

In some embodiments, the No-SQL repository database (RepoDB (12B)) (see FIG. 1B) solution for handling multiple legacy environments and registering a wide variety of configurations (software and hardware, and cloud) by storing technical data to support the end-to-end (E2E) automation and authorization of standard service requests (SSR's) and wherein a table stored in the RepoDB (12B) is configured to hold data (technical data) in No-SQL format and said data are suitable (or may be adapted by said stored table) for implementing functionalities comprising:

providing managed Services (standard service requests) such as, for example and without limitation, adding a database or cloning a database, in very complex environments using at least one other database (Oracle or Mysql or MS SQL or DB2) and;

the automation of SSR's Database (Standard Service Requests).

The No-SQL format is preferably the JSON (JavaScript Object Notation). JSON is an open-standard file format that uses human-readable text to transmit data objects consisting of attribute-value pairs and array data types (or any other serializable value). It is a very common data format used for asynchronous browser-server communication, including as a replacement for XML in some AJAX-style systems.

Figure 2A:
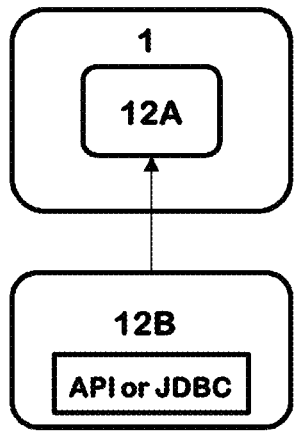
FIG. 2A represents an example of retrieval of data from the RepoDB (12B), according one embodiment.
Figure 2B:
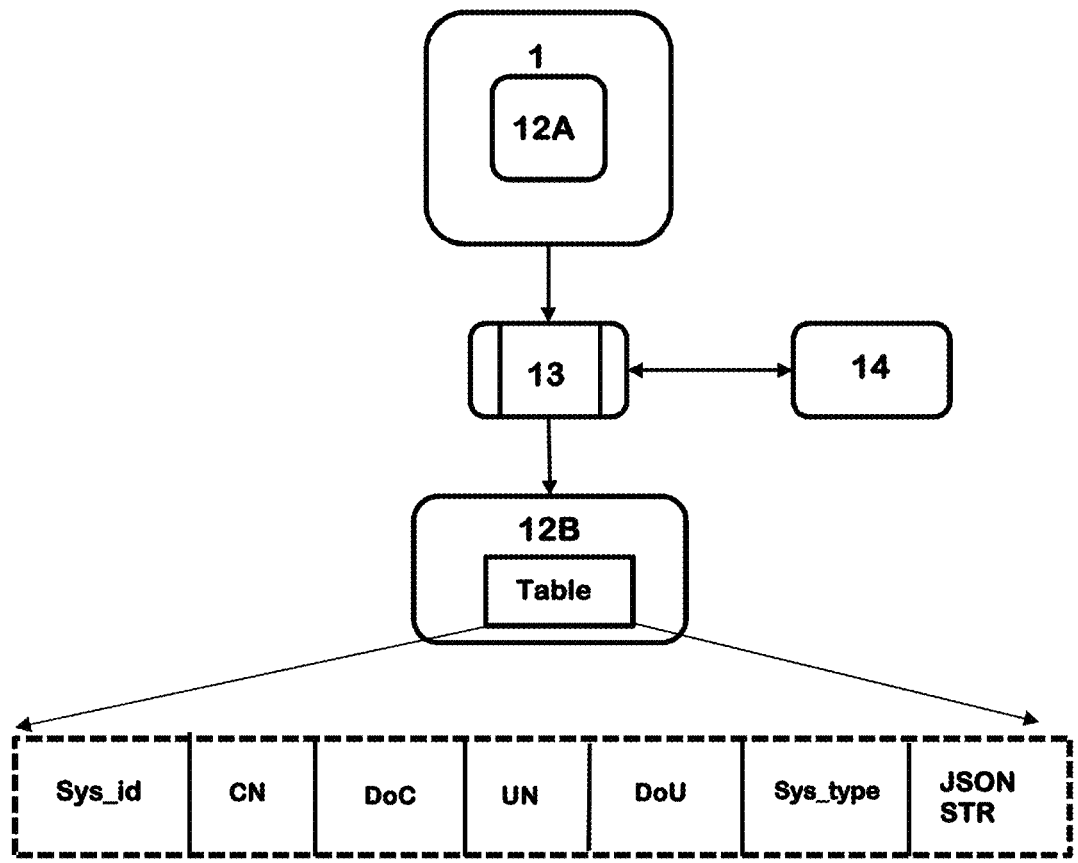
FIG. 2B represents an example of set-up for refreshing of data in the RepoDB (12B), according one embodiment.

In some embodiments, each line of the stored RepoDB (12B) table, see for example FIG. 2B, defines a CI corresponding to a system identity (with the attribute sys_id) and including the creator name (CN) and date of creation (DoC), the updater name (UN) and date of update (DoU), the type of system (sys_type) (host, instance, Software set (SW), database) and a string (JSON STR) of technical detail data in JSON format.

In some embodiments, the No-SQL repository database (RepoDB (12B)) is configured for storing technical data concerning CI (Configuration Items or Control Instances) in a dedicated database (RepoDB (12B)) and sending this data to a GUI (graphical user interface) of a service orchestration platform (1) (for example and without limitation SNOW) uses by an end-user or a service requestor to present this data to said end-user or service requestor in the graphical user interface.

By applying a JSON definition of the technical details of every configuration item or controls instance (CI), the RepoDB (12B) has the flexibility to handle legacy environments and the standardization to enable automation combined with the performance to register complex configuration changes.

In some embodiments, the RepoDB (12B) comprises an API (Application programming interface) for the retrieval of data, as illustrated in FIG. 2A, from said RepoDB (12B) to at least a services orchestration platform (1) or a graphical user interface (12A) of a dedicated user portal. Preferably, the retrieval API is JDBC (Java Database Connectivity) which is a java-based data access technology. The retrieval API comprises at least a set of routines for defining how a client may access the RepoDB (12B).

In some embodiments, the RepoDB (12B) may be used in a system for automation of services standard requests (SSR) in a service provision computing infrastructure, said system comprising at least:

computing means for implementing a services orchestration platform (for example and without limitation ServiceNow (SNOW)) for orchestration and configuration management of services in the computing infrastructure;

an automation execution engine (13, FIG. 2A) (for example and without limitation Ansible) for technical configuration management and automation of the components of the computing infrastructure (for example servers, computer, database, etc)

the system being characterized in that the RepoDB (12B) is interacting, as illustrated on FIG. 2B, through a communication network, with:

the services orchestration platform (1) for interaction with end-user (GUI controls) through controls including SSR, automation execution engine (13) for updates after changes and execution of SSR.

The automation execution engine (13) (For example and without limitation Ansible) implements the process steps defined in orchestration in technology dependent process steps in the real world, for example translates provision an Oracle database in actual commands to provision Oracle database in a certain infrastructure.

JDBC is used for Data retrieval (from RepoDB (12B)) to the services orchestration platform (1) graphical user interface of a dedicated user portal (12A)). The request is made after selecting the Database in the user Interface. After each modification, the automation execution engine (13) is used to refresh JSON data of RepoDB (12B) with data coming from Database target (14).

The services orchestration platform pulls data from the RepoDB to be used in the services orchestration platform portal and for service processing. The automation execution engine pushes data gathered from the systems into the RepoDB. The services orchestration platform uses JDBC for data extraction from the RepoDB, whereas the automation execution engine uses a direct database connection for pushing the data into the RepoDB.

End users ordering SSR's may require information from the target systems displayed in their user interface to be able to change this data. Examples of data to be changed can be database users, database datafiles or database parameters.

To be able to order a request, a CMDB (10) (Cloud management database) (10), for example, may be required to select the proper computing infrastructure Component/database. Configuration Items as service offerings, databases, hosts, are stored within the CMDB (10). The current CMDBs (10) (for example such that of ServiceNow) are using a relational model to store data in a structured way (see FIG. 1A for example). The limitation of a relational data model is the model itself is not flexible.

Multiple vendors in complex IT environments, Specifically, in complex IT environments with many different generations of technologies there are many different parameters to be stored when implementing SSR's. For example, each database vendor is having their own specific technical implementation. The registration of this different information should be as generic as possible.

Another issue that may be encounter by an end-user when ordering a SSR is that retrieving information directly from the customer source databases is not possible because of the latency by network. Populating a user interface should take no longer than a few seconds.

Having a complex IT environment with different vendors with their own solutions and solutions changing per version demands a very flexible way of storing this required information. So called Meta Data Repositories (MDR) are missing the flexibility of changing the model regularly.

The RepoDB (12B) as described in the present application consists of an external database holding non-structural data (JSON for example) to store all technical data not suitable to be stored in the CMDB (10). Configuration data (service related and therefore no changes to the data model) is still stored in a traditional CMDB (10). On graphical user interface level, CMDB (10) data and RepoDB (12B) data is brought together to display all required data to the end-user.

Examples of the CMDB (10) and RepoDB (12B) data that may be presented are:

CMDB (10):
Service Offering
Database Instance
Host
Commitments (like agreed maintenance windows, availability etc.)
Customer roles (e.g. functional owner, financial approver)
Services management platform roles (support groups, customer relations)
RepoDB (12B):
Files used by the database (e.g. names, size)
Database Users and roles (names, relations, defaults)
Parameters (name and current settings, (sub) versions)

All technical data such as the one described above and retrieved from the Customer source systems (databases) will be stored in the RepoDB (12B). It should be understood that the above-mentioned list of technical data or items stored in the RepoDB is not limited to the quoted data. The number of items may vary. For example, the list may contain at least 20 items or above.

Therefore, a Service Provider's RepoDB (12B) may store technical data to support the E2E automation and authorization of SSR's (Standard Service Requests). These detailed data are used in a process for populating the GUI of the services orchestration platform (1) (for example ServiceNow) to enable the end user to select the proper action.

The invention also concerns a process for providing automation of services standard requests (SSR) in system using the RepoDB (12B) as described in the present application and comprising at least a services orchestration platform (1) and automation execution engine (13), a process wherein after an end-user of a services orchestration platform (for example and without limitation SNOW), communicating with a RepoDB (12B) as described above (through a communication network), selects a new order (or standard service requests) from a catalogue of said services orchestration platform through a graphical interface user (GUI) of a dedicated user portal (12A), said GUI prompts said end-user to select a CI so as to populate controls or attributes commands in the user interactive interface by mean of a message, containing data to be loaded and, sent by the RepoDB (12B) to the services orchestration platform.

In some embodiments, the type of data of such attributes or controls depends on the Standard Service Requests (SSR).

In some embodiments, when the order is not included in the catalogue of the services orchestration platform workflow (11), an execution of such order is required by a command sent, by the services orchestration platform, to an automation execution engine (13) (for example and without limitation Ansible) to let execute the command on the target database (14) defined by the CI selected by the end-user. The catalog comprises at least the enabled SSR for a specific customer and the workflow is managing the actions to cover said SSR.

In some embodiments, the end-user may complete with required details the order form displayed on the user graphical interface by means of a set of information included in the loaded data contained in the message sent by the RepoDB (12B).

In some embodiments, after the order is completed, a refresh routine included in the automation execution engine (13) (for example Ansible refresh playbook is called to refresh specific data for a specific CI in the RepoDB (12B)). The refresh routine of the automation execution engine (13) is pulling the data from the database system, converts said data to JSON and stores this JSON in the RepoDB.

The RepoDB (12B) allows us to do analytics and analysis of the various Technical Environments at Customers (Version, Technical configuration data). Indeed, the RepoDB (12B) comprises at least a routine to gather data so as to be able to do analytics.

It will be easily understood upon reading the present application that the particularities of the present invention, as generally described and illustrated in the figures, may be arranged and designed according to a great variety of different configurations. Thus, the description of the present invention and the related figures are not provided for limiting the scope of the invention but simply illustrating selected embodiments.

One skilled in the art will understand that the technical features of a given embodiment may in fact be combined with features of another embodiment unless the opposite is explicitly mentioned or if it is obvious that these features are incompatible. Further, the technical features described in a given embodiment may be isolated from the other features of this embodiment unless the opposite is explicitly mentioned.

It should be obvious for persons skilled in the art that the present invention allows embodiments under many other specific forms without departing from the field defined by the scope of the appended claims, these embodiments should be considered as an illustration and the invention should not be limited to the details given above.

What is claimed is:

1. A No-SQL repository DataBase (RepoDB) for handling multiple legacy environments and registering a wide variety of configurations by storing technical data to support end-to-end (E2E) automation and authorization of standard service requests (SSR), wherein said RepoDB comprises:
  a table stored in said RepoDB that is configured to hold said technical data in No-SQL format and for providing managed services in complex environments using at least one other database and for automation of Database SSR's,
  wherein the RepoDB is configured to
  store said technical data concerning configuration items or control instances (CI) in said RepoDB, and
  send the technical data to a graphical user interface (GUI) of a services orchestration platform used by an end-user or a service requestor to present the technical data to said end-user or said service requestor in the GUI of a user computer,
    wherein the GUI is configured to
  enable a dedicated user to select a new order of said standard service requests from a catalogue of said services orchestration platform, and
  prompt, after said select said new order, said dedicated user to further select a configuration item so as to populate controls or attributes commands in the GUI via a message, containing data to be loaded and sent by the RepoDB to the services orchestration platform; and,
    wherein each line of the table stored in the RepoDB defines said configuration items (CI) corresponding to a system identity with an attribute sys id and including a creator name and date of creation, an updater name and date of update, a type of system and a string of technical detail data in JavaScript Object Notation (JSON) format; wherein said type of system comprises host, instance, software set and database.

2. The No-SQL repository database according to claim 1, wherein the No-SQL format used is (JavaScript Object) Notation (JSON).

3. A system for automation of services standard requests (SSR) that uses a repository DataBase (RepoDB) in a service provision computing infrastructure, said system comprising: a processor comprising computing means implementing a services orchestration platform for orchestration and configuration management of services in the service provision computing infrastructure;
  an automation execution engine for technical configuration management and automation of components of the service provision computing infrastructure;
  a graphical user interface (GUI) of a dedicated user;
  wherein the RepoDB, through a communication network, interacts with the services orchestration platform for interaction with end-user GUI controls through controls including said SSR; or the automation execution engine for updates after changes and execution of said SSR required by a command sent by the services orchestration platform to the automation execution engine to let execute the command on a target database defined by a configuration item selected by the dedicated user using the GUI; and,
  wherein each line of a table stored in the RepoDB defines said configuration items (CI) corresponding to a system identity with an attribute sys id and including a creator name and date of creation, an updater name and date of update, a type of system and a string of technical detail data in JavaScript Object Notation (JSON) format; wherein said type of system comprises host, instance, software set and database.

* * * * *